(12) United States Patent
Windecker

(10) Patent No.: US 6,901,768 B1
(45) Date of Patent: Jun. 7, 2005

(54) ENVIRONMENTALLY CONTROLLED STORAGE AND RIPENING APPARATUS

(76) Inventor: Robert J. Windecker, 6145 Celadon Cir., Palm Beach Gardens, FL (US) 33418

( * ) Notice: Subject to any disclaimer, the term of this patent is extended or adjusted under 35 U.S.C. 154(b) by 0 days.

(21) Appl. No.: 10/858,861

(22) Filed: May 30, 2004

(51) Int. Cl.[7] .............................................. F25D 17/04
(52) U.S. Cl. ............................. 62/407; 62/239; 62/374; 62/408
(58) Field of Search .......................... 62/239, 371, 374, 62/388, 408, 440, 457.9

(56) References Cited

U.S. PATENT DOCUMENTS

| | | | | |
|---|---|---|---|---|
| 3,961,925 A | * | 6/1976 | Rhoad | 62/376 |
| 4,576,017 A | * | 3/1986 | Combs et al. | 62/372 |
| 4,704,876 A | * | 11/1987 | Hill | 62/388 |
| 5,337,579 A | * | 8/1994 | Saia et al. | 62/239 |
| 5,649,432 A | * | 7/1997 | Cavalea, III | 62/457.1 |

* cited by examiner

Primary Examiner—Melvin Jones
(74) Attorney, Agent, or Firm—McHale & Slavin

(57) ABSTRACT

A self-contained apparatus for maintaining perishable produce in a controlled environment has a novel air vent and damper system to provide optimal airflow within the apparatus to maintain and ripen perishable produce. An arrangement of seals within insulated compartments cooperate with the physical dimensions of palletized produce inserted therein to direct air flow therethrough to achieve optimal air flow characteristics. The air vent and damper system of the invention allows the apparatus to operate at peak efficiency regardless of the number of pallets present in the apparatus. The apparatus also includes a horizontal push back cart system which does not interfere with the seal arrangement by using an elastic biasing means instead of prior art gravity feed methods. The self-contained apparatus can be used as a modular unit, and encompasses all the equipment necessary for installation while offering temperature stability, simplified maintenance requirements, and ultimately, precise control of ripening.

28 Claims, 9 Drawing Sheets

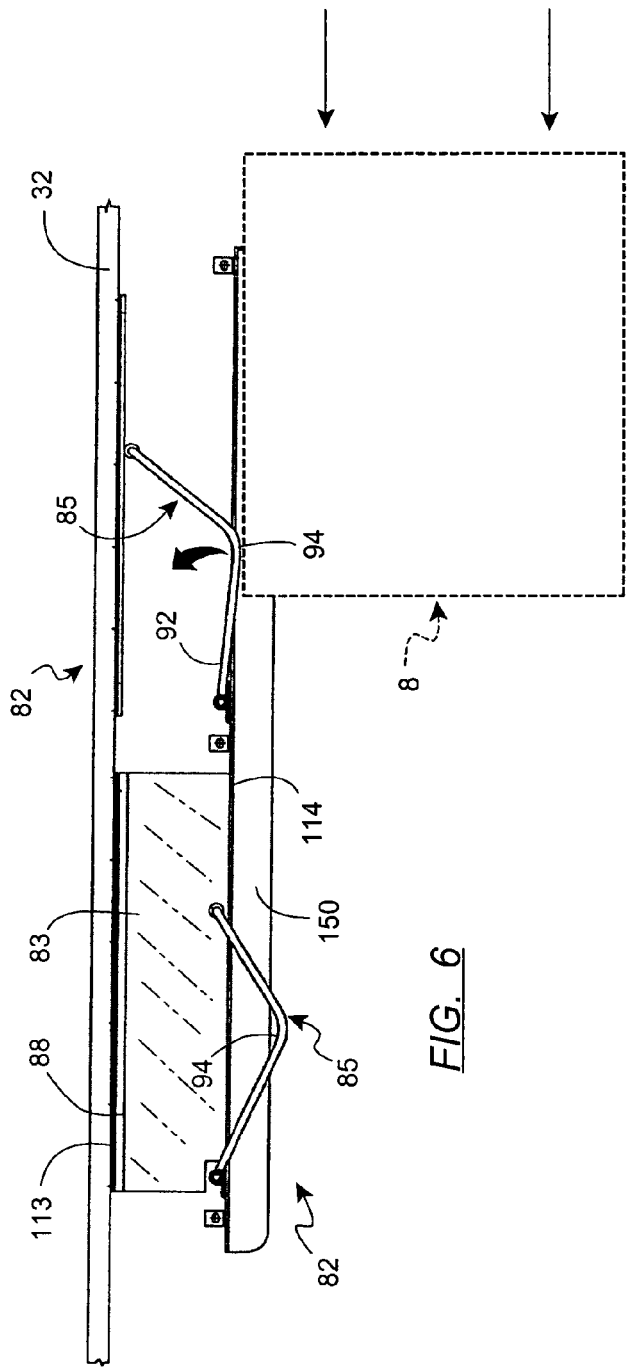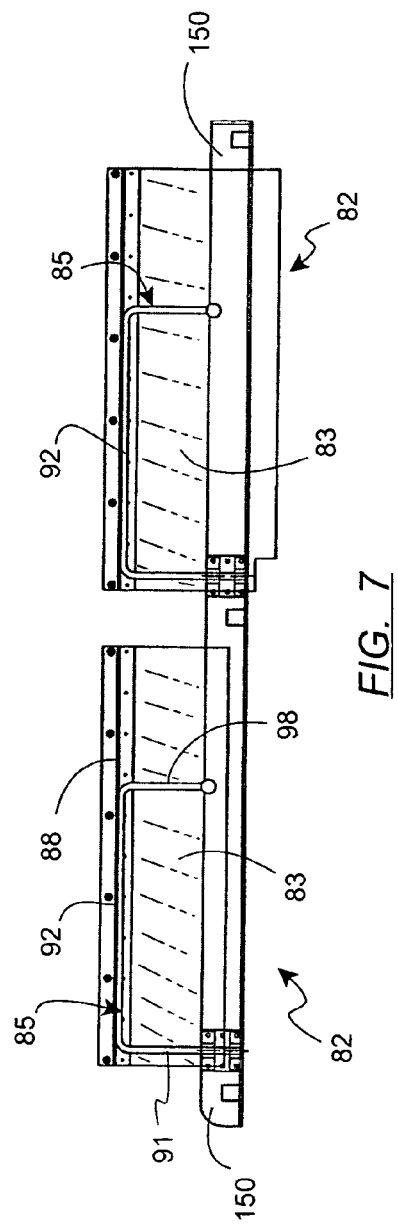

ENVIRONMENTALLY CONTROLLED STORAGE AND RIPENING APPARATUS

FIELD OF THE INVENTION

The present invention relates to an apparatus for the controlled storage and ripening of perishable products; more particularly to self-contained temperature controlled apparatus utilizing a novel air vent and damper system to provide optimal airflow within the apparatus to maintain and ripen perishable produce.

BACKGROUND OF THE INVENTION

Ripening rooms are well known in the art for enabling precisely controlled ripening of perishable products such as bananas, tomatoes, avocados, kiwi, mangoes and the like. The fruits and vegetables are harvested immature and shipped refrigerated to distribution centers where they are matured in ripening rooms. Various methods have been employed to control air flow and inside temperature by altering room design, pallet or container size and location within the room, or even the method in which product is unloaded and loaded onto trucks in and out of the room.

Most modern ripening rooms utilize a "drive-in" style rack to stack pallets in 2-tier or 3-tier placement to conserve warehouse floor space. In conserving floor space, the stacked boxes of produce reach a height requiring specialized forklifts. Contrary to the rest of the warehouse which generally employs the standardized narrow-aisle forklifts, narrow counterbalanced type forklifts must be utilized to load and unload pallets within the typical ripening room because their narrow masts will fit between the load rails of the drive-in rack. This type of forklift is required to be driven into the room each time a pallet is to be loaded or unloaded, resulting in excessive labor costs when executed at full scale. This need for specialized forklifts puts the typical ripening room at a disadvantage from a perspective of equipment and labor cost. By way of example, a 3-tier, 42 pallet ripening room may require two hours or more to load or unload, which is then multiplied by 20 or greater for the total number of ripening rooms a distribution center customarily employs. In addition, driving the heavy pallets, while raised more than 10 feet in the air, down a narrow corridor between the pallet rack load rails is not only time-consuming, but also may result in damage to the forklift, fruit pallet, or other structures associated within a ripening room.

The refrigeration system of a typical ripening room is capable of producing (in. British. Thermal. Units per pound) approximately 2 BTU/lb of produce; the determining factor in the calculation and regulation of the desired ripening schedule. In order to trigger the onset of ripening, ethylene gas, acting as a plant hormone, is introduced into the ripening room. The concentration and duration of ethylene gassing varies with the type of fruit. The amount of ethylene used is then calculated based on the volume of the ripening room.

Cold storage rooms and pre-coolers are other types of refrigerated rooms utilized in product storage. Unlike the "drive-in" style pallet rack of prior art ripening rooms, cold storage rooms are usually arranged with narrow aisles for high-density storage of the "select" type storage racks. The preferred narrow-aisle forklifts with outriggers "select" (rapidly add and remove) pallets from the pallet rack. Fruits and vegetables requiring a lower temperature than 40° F. may be a major cost factor. Additionally, several coolers may be required in order to properly store ethylene producers separately from ethylene-sensitive fruits and vegetables.

Some cold storage rooms are made "gas tight" for controlled atmosphere storage for products such as flowers, some fruits, vegetables, and meats. For instance, the physiological condition of apples can be maintained for six months in controlled atmosphere storage. Nevertheless, in addition to the heavy expense to install, these rooms promote environment hazardous to the workers who must enter the controlled atmosphere room.

Pre-coolers are designed to remove field heat from freshly harvested produce or flowers. Forced-air pre-coolers are often located in cold rooms, preferably near the harvest site. However, the expense, delivery time, and installation time of pre-coolers can be considerable.

Freezers pose further structural and operational challenges. Floors must be insulated and heated in order to prevent floor heaving. The entrance doors require enhanced insulation. Also, forklifts and human operators must work for sustained periods in the sub-freezing environment.

Thus, if a self-contained modular storage unit could be designed for the controlled ripening of products which was also customizable for related refrigeration and cold storage utilities and could be provided in a cost-effective manner which is simple to implement, provides compatibility with the standard narrow-aisle forklifts, and is without substantial hazard to workers, a long-felt need would be realized.

DESCRIPTION OF THE PRIOR ART

U.S. Pat. No. 6,077,160 discloses a ripening room for perishable products in which the air flow and temperature are closely controlled by the room construction and by a cooling control system that archives uniform ripening of the fruit regardless of its location within the room. Uniform ripening is achieved by circulating cooling air uniformly through the fruit. This method also incorporates adjusting the amount or temperature of cooled air introduced into the operational area to some intermediate point to eliminate dehydration or undercooling. Particularly disclosed features include an air distribution ceiling designed to encourage uniform air pressure along the tops and sides of the fruit boxes throughout the entire room, a temperature set point controller, and an air mixing chamber. U.S. Pat. No. 6,077,160 is a division of U.S. Pat. No. 5,899,084, wherein the former claims the room for ripening and the latter describes the method of controlling the operation of a ripening room cooling system. These inventions do not contemplate a self-contained structure for ripening products to be positioned within a room.

U.S. Pat. No. 5,671,609 discloses a method for a controlled environment for the portable storage of produce, wherein the following objectives are accomplished: initiated ripening; ripening; cooling and heat removal; temperature stabilization; and the loading and unloading of palletized fruit on skid-mounted rollers (for effortless movement once inside). The trailer apparatus is designed to hold pallets within its insulated rectilinear cabin. The invention the prior need for temporary fruit storage space which can be increased and decreased in size. It is essential to this invention that ceiling-mounted air cooling units are uniformly distributed throughout the trailer along the long edge of the palletized fruit. An air suction chamber is included. This patent fails to contemplate the further placement of the insulated cabin into the ripening room.

U.S. Pat. No. 5,419,153 provides a method and apparatus for ripening fruit, with particular reference to the construction and operation of banana ripening rooms. The ripening room construction incorporates a means for receiving a plurality of stacked loaded pallets in at least two spaced apart rows, a fan means resulting with air passing through pallets, and a sealing means comprising a flexible flap means. A false ceiling holds four blower fans for air circulating and conditioning. This patent fails to contemplate a self-contained structure for ripening which can be placed within a room.

U.S. Pat. No. 5,121,877 teaches a container, adapted to be stacked in a pallet load, for ripening of fruit during storage and shipment in a controlled environment. This patent fails to contemplate a fully self-contained structure for ripening products which can be easily installed and relocated as necessary within a ripening room.

U.S. Pat. No. 6,405,644 issued to the inventor of the present application discloses a self-contained storage and ripening apparatus which addresses and solves many of the problems and drawbacks of the above-described prior art systems. The content of this patent is herein incorporated by reference. The present invention is an improvement thereover in that it provides a novel system for rapid pressurization of the apparatus independent of the number of pallets currently stored therein. The present invention further provides an improved horizontal push-back cart assembly adapted for use with the apparatus designed to replace convention gravity feed push back cart systems which are not suitable for use with the apparatus disclosed in U.S. Pat. No. 6,405,644.

SUMMARY OF THE INVENTION

Accordingly, it is an objective of the instant invention to provide an apparatus for maintaining palletized goods in a controlled environment, e.g. for the ripening of perishable products.

It is a further objective of the instant invention to provide an apparatus for maintaining palletized goods in a controlled environment which is a self-contained appliance.

It is another objective of the instant invention to provide an apparatus for maintaining palletized goods in a controlled environment which can be easily transported between various locations.

It is yet another objective of the instant invention to provide an apparatus for maintaining palletized goods in a controlled environment which allows efficient loading and unloading of product and ease of accessibility via standard warehousing devices such as forklifts.

It is still another objective of the instant invention to provide an apparatus for maintaining palletized goods in a controlled environment which provides a means for rapid pressurization which is independent of the number of pallets present in the apparatus.

It is still another objective of the instant invention to provide an apparatus for maintaining palletized goods in a controlled environment which is constructed and arranged such that pallets inserted therein engage with a sealing means to provide a partially closed air space adjacent to each pallet to facilitate optimum air flow characteristics.

It is still another objective of the instant invention to provide an apparatus for maintaining palletized goods in a controlled environment which includes a horizontal push back cart system having an elastic biasing means.

In accordance with the above objectives, an apparatus for maintaining palletized goods in a controlled environment comprises an insulated cabinet defined by a top wall, a bottom wall, a back wall, and opposing side walls defining an upright container with a generally open front having a perimeter with the open front being sealable by a front wall constructed as a selectively openable access mean in sealing engagement with the perimeter. The cabinet has a depth sufficient to receive two rows deep of palletized goods and a height sufficient to receive a plurality of palletized goods in a vertically stacked arrangement thus providing a plurality of tiers. The cabinet includes at least one insulated vertical wall normal and contiguous to the back wall which extending from the top wall to the bottom wall to define at least two vertically oriented chambers in the cabinet. The vertical walls have front edges in a coplanar arrangement with the perimeter and include sealing means thereon which is engageable with the front wall. Each of the vertically oriented chambers have opposing side surfaces and a width sufficient to receive two pallets of produce in a spaced apart relationship defining an interstitial air space there between. The front wall can be constructed as a plurality of sliding doors disposed in tracks in the top wall and bottom wall.

The cabinet further includes a plurality of horizontal rack assemblies in each of the chambers corresponding to each of the tiers and defining a plurality of pallet receiving compartments within the chamber. The horizontal rack assemblies are adapted to receive palletized goods in a two-deep and two-across arrangement such that the palletized goods are in a spaced apart relationship defining an interstitial air space there between. A portion of the perimeter of the horizontal rack assembly adjacent the front wall includes a gasket attached thereto adapted for sealing engagement with the front wall.

An airflow generating means in airflow communication with each of the chambers is constructed and arranged to provide airflow into each chamber, thereby causing air to flow between the interstitial spaces and the side airspace. A refrigeration means is in operative communication with the airflow generating means. A means for injecting ethylene gas into the chamber is also provided.

Left and right vertical sidewalls are respectively adjacent to the opposing side surfaces in each of said pallet receiving compartments which are positioned to adjacently align with pallets inserted therein. The vertical sidewalls cooperate with the pallets to define left and right plenum chambers encompassing the side air spaces, and are dimensioned to expose portion of the pallets to the plenum chamber.

The cabinet can include a plurality of vertically oriented gaskets affixed to each of the opposing side surfaces of the chambers which extend from the top wall to the bottom wall. In a preferred embodiment, three gaskets are respectively positioned proximate the back wall, the front perimeter, and at a midpoint therebetween thus defining a division of each of the compartment into forward and rearward sections. The gaskets are adapted to engage with vertical edges of a pallet of goods inserted therein to provide a partially closed airspace adjacent to the pallet of goods.

At least one damper is disposed between the vertical side walls and one of said opposing side surfaces which is configured to prevent airflow through the plenum chamber in a closed position and permits airflow therethrough in an open position. The damper is operatively associated with a lever adjacent thereto which is configured and positioned to be displaceable by the insertion of a pallet of goods into said pallet receiving compartment, wherein the displacement of the lever opens the damper to permit airflow through the plenum chamber adjacent the pallet. The displacement of the lever means opens the damper whereby airflow is only directed through sections having pallets inserted therein.

The refrigeration means and airflow generating means can be disposed in a housing positioned under the bottom wall, and can be either a modular component or integral to the apparatus. The bottom wall includes apertures therein permitting airflow therethrough In an alternative arrangement, the refrigeration means and airflow generating means are disposed in a housing positioned above the top wall, with the top wall including apertures therein permitting downward airflow therethrough.

The horizontal rack assembly can include at least one pair of longitudinal carrier rails spaced apart to support a pallet load therebetween and extending from the back wall to the front perimeter. A lateral support coplanar with the front perimeter is attached to the opposing side surfaces of the chamber wherein the carrier rails are secured to the lateral support. A cart sized to receive a pallet load and includes wheels positioned within the longitudinal carrier rails to permit rolling translation of the cart along the longitudinal carrier rails. An elastic biasing means, such as a length of elastic cord or a bungee cord, connects the lateral support and the cart, wherein the rectangular cart is biased in a forward position, whereby a first pallet can be loaded onto the cart and urged to a rearward position by loading a second pallet onto the carrier rails, and the rectangular cart returns to the forward position upon removal of the second pallet.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 6 is a top view of the damper assembly of the apparatus showing pallet partially inserted therein;

FIG. 7 is a side view of the damper assembly of the apparatus;

DETAILED DESCRIPTION OF THE INVENTION

Figure 1:
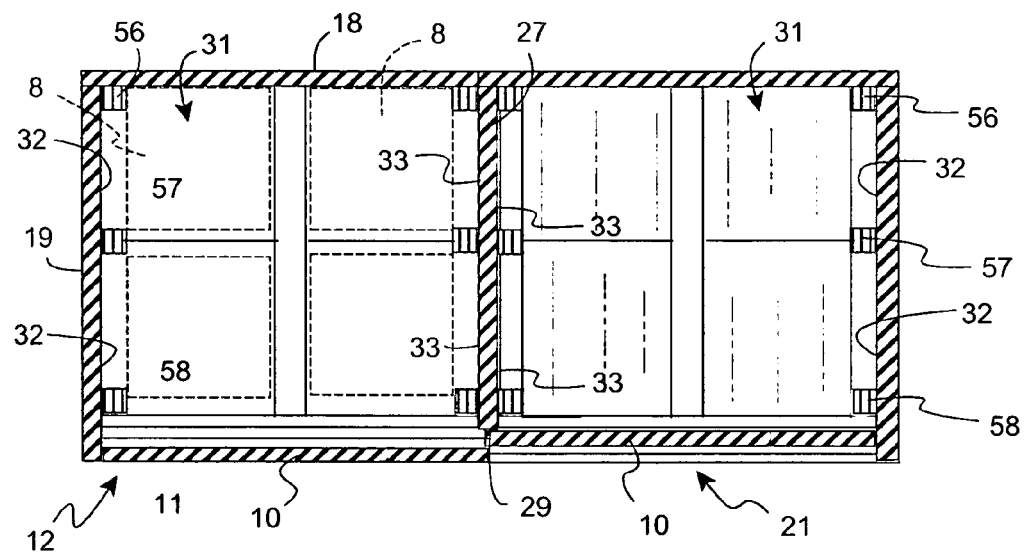
FIG. 1 is a top view of the apparatus according to a preferred embodiment of the invention, shown in cross-section.

Although the invention will be described in terms of a specific embodiment, it will be readily apparent to those skilled in this art that various modifications, rearrangements, and substitutions can be made without departing from the spirit of the invention. The scope of the invention is defined by the claims appended hereto. The present invention is directed toward alleviating existing problems associated with the installation and daily operating activities surrounding ripening rooms and related controlled environment facilities by providing a self-contained and versatile palletized cabinet for the precise control of ripening. Some examples of the many elements providing improvement are the location of cooling units; configuration of access doors; interrelationship between pallets and pallet cabinet; modular footprint; energy efficiency; labor efficiency; and placement flexibility. The present invention is predicated upon a non-specialized modular base construction unit adaptable for use as a cooler, a controlled atmosphere cooler, a freezer, a pre-cooler, a ripening room, or the like. For purposes of illustration, a ripening room will be described, although any of the alternative embodiments are contemplated. In addition, no construction is necessary in order to place several units together. The integral refrigeration unit can be disposed above or below the cabinet and includes a ready access means allowing for ease of maintenance operations. Cost-benefit is achieved through the use of warehouse standard narrow-aisle reach-type forklifts, larger, lower speed fans, and a smaller size of evaporator coils. Additionally, the design and location of the door minimizes air leakage, heat transfer, and reduces potential damage.

The modular style of the present invention offers many advantages over the installation of a typical ripening room. Ripening rooms are most often designed to fit within a warehouse area and as such are custom designed and manufactured. A ripening room can require thirty to forty man days of mechanical, electrical, and refrigeration labor to install. Although numerous configurations are contemplated, in a preferred embodiment, the palletized base unit cabinet is manufactured in two sizes, a 2-tier 24-pallet model and a 3-tier 24-pallet model. Older warehouses and smaller warehouses which do not have the interior height for a 3-tier model may utilize the 2-tier model. Standard drawings and standard parts are used for these two models. Insulated panels for the chamber walls, an integral structural support locating means for proper pallet positioning, a unit cooler, motor starters, controls, a wiring harness, and other components are designed and manufactured for minimum labor requirements providing rapid assembly at the job site. Installation of a palletized cabinet requires approximately one-half the labor of a comparable ripening room. In the construction of prior art ripening rooms, building permits must be obtained, whereas palletized cabinets are more akin to appliances and may not require permits.

Since the present invention does not require curbs or support from the warehouse structure, the cabinets of the instant invention can be added, moved, or removed as the warehouse business changes. This portability is a significant improvement over prior art ripening room which are very expensive and time consuming to relocate, often prohibitively so.

Figure 2:
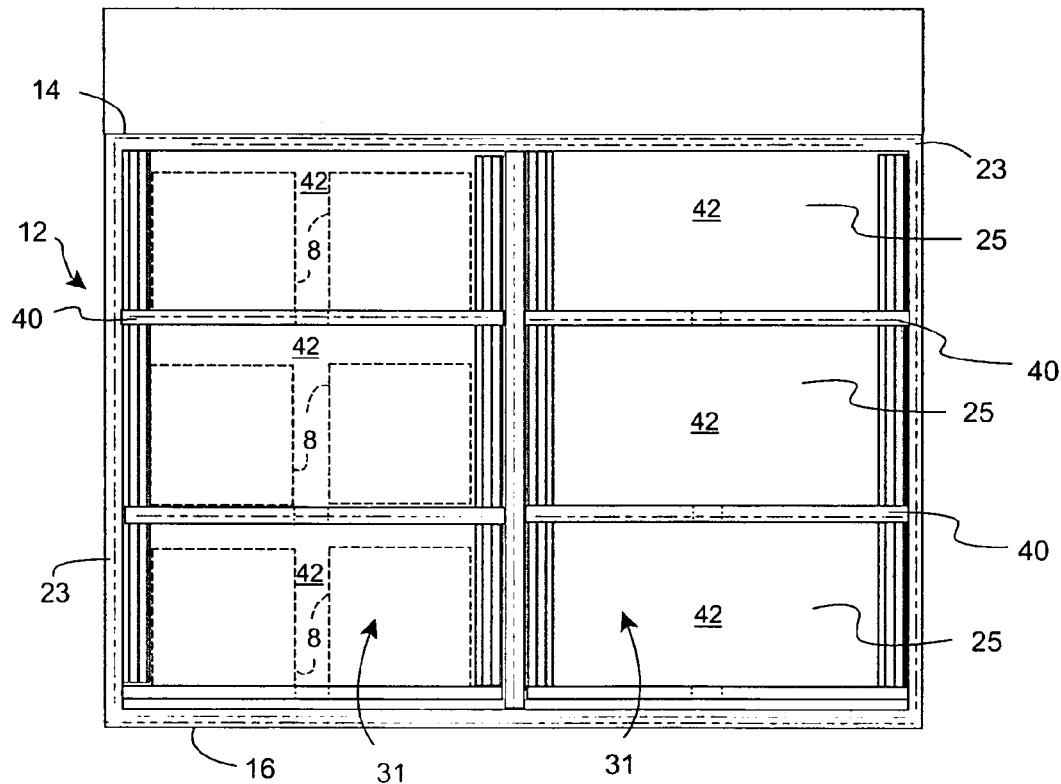
FIG. 2 is front view of the apparatus of FIG. 1, with the front doors omitted for ease of illustration.

FIGS. 1–2 illustrate an apparatus for maintaining palletized goods in a controlled environment according to a preferred embodiment the invention. FIG. 1 is a cross-sectional top view of the apparatus, and FIG. 2 is a front view of the apparatus illustrated with a front wall omitted for ease of illustration. The apparatus includes an insulated cabinet 12 which is defined by a top wall 14, a bottom wall 16, a back wall 18, and opposing left and right walls 19,20 which define an upright container which is open at the front and has a front perimeter 23. The open front of the container is sealable by a front wall 21 constructed as a selectively openable access means in sealing engagement with the front perimeter 23. The cabinet 12 has a depth sufficient to receive two rows deep of palletized goods, and a height sufficient to receive palletized goods in a vertically stacked arrangement such that the cabinet 12 has a plurality of vertical tiers. In the illustrated embodiment, the cabinet 12 has three tiers, each indicated as 25. The front wall is preferably constructed as at least 2 slidable slab doors 10, which are slidably disposed in tracks 11 in the top wall 14 and bottom wall 16.

The cabinet 12 includes at least one insulated vertical wall 27 which is normal and contiguous to the back wall 18, and extends from the top wall 14 to the bottom wall 16 to define at least two vertically oriented chambers 31 in the cabinet 12. The vertical wall 27 has a front edge 29 in a coplanar arrangement with the front perimeter 23, and preferably includes sealing means thereon which engages with the front wall 21 when the slab doors 10 are closed. The edges around each chamber 31 are thus sealed and baffled to allow each chamber 31 to act as an individual unit. Each of the vertically oriented chambers 31 have opposing side surfaces 32,33 and a width sufficient to received two pallets of produce in a spaced apart relationship, with airspaces in between the pallets and between the pallets and opposing side surfaces 32, 33. The chambers 31 and tiers 25 are of a size that permits a standardized forklift truck, such as a narrow-aisle forklift or an automated forklift, to remove stacks of produce from the chambers 31.

A plurality of horizontal rack assemblies 40 are located in each of the chambers 31 corresponding to each of the tiers 25. The horizontal rack assemblies 40 define a plurality of pallet receiving compartments 42 within each chamber 31. In the preferred embodiment, the horizontal rack assemblies 40 are adapted to hold palletized goods of perishable produce in a two deep and two across arrangement such that the palletized goods are in a spaced apart relationship defining an interstitial air space 162 therebetween and side air spaces 163 on the outside of the two pallets. This arrangement ensures optimal air flow patterns within the cabinet for maintaining perishable goods. A portion of the perimeter of the horizontal rack assembly 40 adjacent the front wall includes a gasket attached thereto (not shown) adapted for sealing engagement with the front wall 21.

Figure 3:
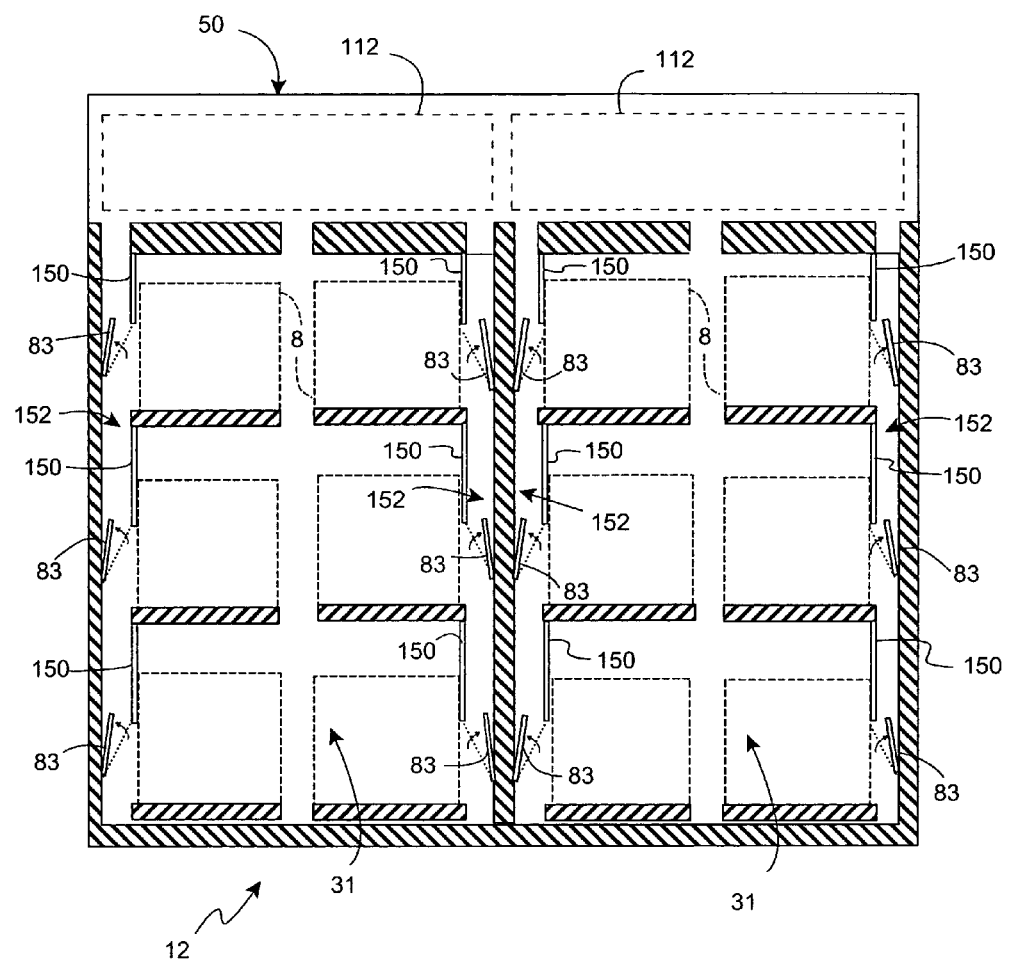
FIG. 3 is a front cross-sectional view of the apparatus of claim 1 with pallets depicted therein in phantom.

FIG. 3 illustrates a front cross-sectional view of the apparatus with pallets 8 shown therein in phantom. As shown in FIG. 3, the apparatus includes left and right vertical sidewalls 150 respectively adjacent to the opposing side surfaces 32,33 in the each of pallet receiving compartments. The left and right vertical sidewalls 150 are positioned to adjacently align with pallets inserted into the compartments 42 so that the vertical sidewalls cooperate with the pallets to define left and right plenum chambers 152 which encompass the side air spaces 163 adjacent the opposing side walls 32,33. The vertical sidewalls 150 are dimensioned to only partially cover the surface of a pallet; so that a large portion of the surface of the pallet is exposed to the plenum chamber 152. Air is thus allowed to permeate the perforated produce containers on the pallet. Pallets 8 depict in the apparatus in phantom.

An airflow generating means is in airflow communication with each of the chambers 31 and is constructed and arranged to provide airflow into each chamber. The airflow generating means is integral to a refrigeration unit 112, which can be disposed in a housing 50 which can be positioned either above the top wall 14 or below the bottom wall 16. The housing 50 can be either integral to the apparatus or a modular component. The apparatus is designed to create a pressure differential for ideal airflow within each of the chambers 31. Air circulates along a continuous flow path. Air from the airflow means, such as a forced-air fan (not shown), becomes pressurized as it passes the space between two evaporator coils within the refrigeration unit 112, causing the now pressurized air to flow along either side of each chamber 31.

Figure 4:
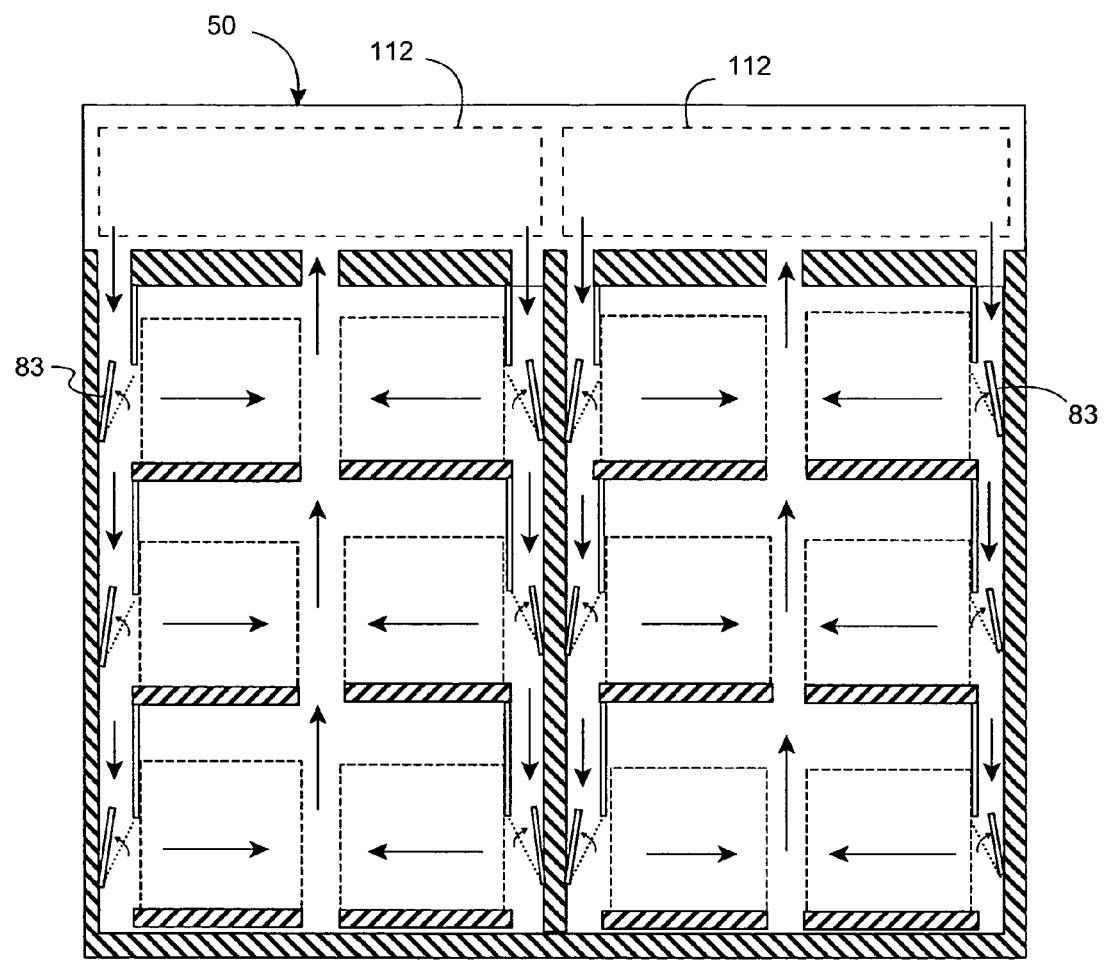
FIG. 4 is a front cross-sectional view of the apparatus of claim 1 which depicts the exemplary flow of air through the apparatus with pallets depicted therein in phantom.

FIG. 4 illustrates an embodiment in which the refrigeration unit 112 is positioned in a housing above the cabinet 12, and depicts the exemplary flow of air through the apparatus. In this embodiment, the top wall 14 includes ports therein allowing the flow of air therethrough. The top wall 14 preferably includes ports 170 aligning with the plenum chambers 152 and the interstitial air space 162. As shown in FIG. 6, a force-air fan injects air into the apparatus through the plenum chambers 152, and it returns to an intake port in the unit 112 aligning with the interstitial air space 162.

Figure 5:
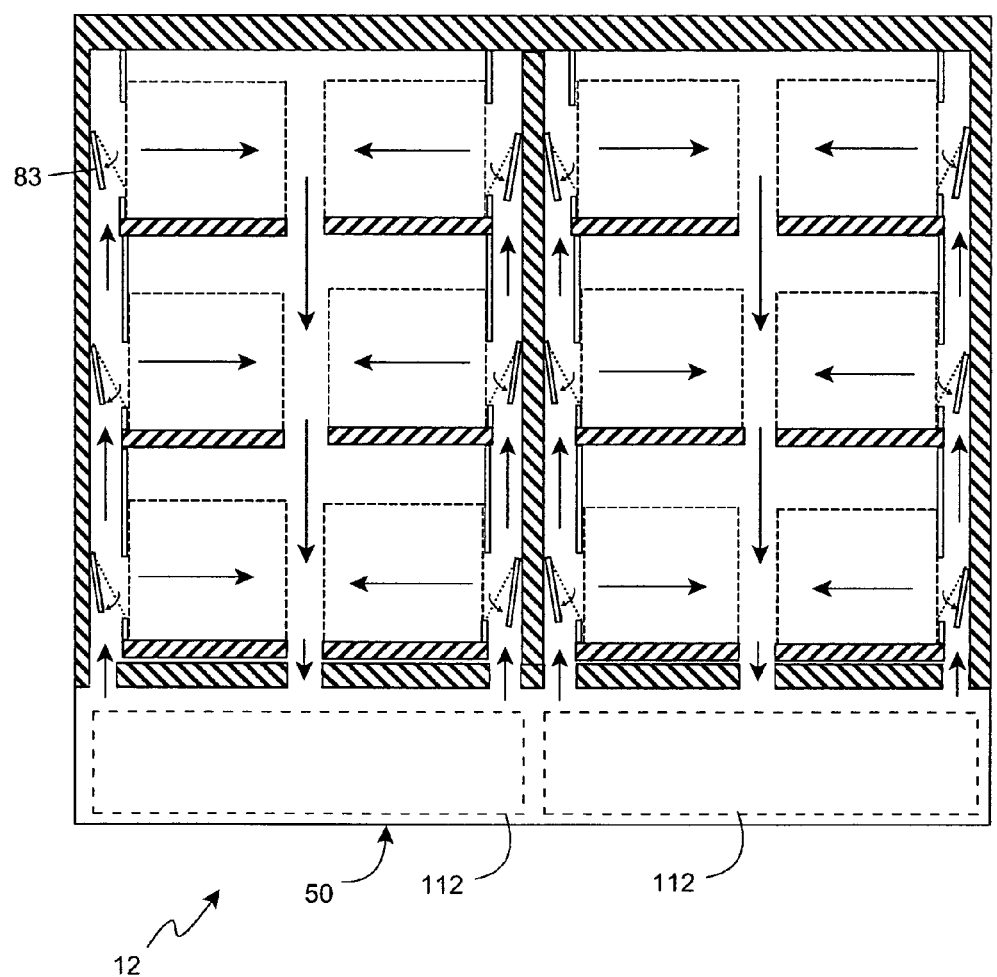
FIG. 5 is front cross-sectional view of an alternative embodiment having a refrigeration unit on the bottom with pallets depicted therein in phantom.

FIG. 5 illustrates an embodiment essentially inverted from the one shown in FIG. 4, with the refrigeration unit 112 being positioned beneath the cabinet 12, and the bottom wall 17 including ports allowing the flow of air. The bottom wall 16 preferably includes ports 180 aligning with the plenum chambers 152 and the interstitial air space 162. The airflow created in the apparatus by this arrangement is assignment shown in FIG. 7.

As is the general practice in the industry, produce is stored in protective boxes, with each box including side openings to permit air circulation therethrough. The physical dimensions of the palletized goods stored within the cabinet 12, inclusive of the pallet itself and produce stored in vented containers stacked on the pallet, cooperate with the interior configuration of the cabinet 12 to provider for idealized airflow to maintain and/or ripen produce. As pressurized air flows upward (or downward) along the airspace between a wall and a side of a pallet, air becomes depressurized in the airspace between two pallets, thus forcing air to cross through the produce stacked upon a pallet and back into a pressurized airspace.

In order to further provide for optimal airflow properties, the cabinet 12 can further include a plurality of vertically oriented gaskets which can be affixed to each of the opposing side surfaces of the chambers 31. The gaskets can be any suitable type, such as bulb gaskets or blade gaskets. The gaskets preferably extend from the top wall 14 to the bottom wall 16, and are gaskets adapted to engage with vertical sides of a pallet of goods inserted into the compartments 42.

In preferred embodiment depicted in the cross-sectional view shown in FIG. 1, the cabinet 12 can include n the at least three gaskets 56, 57, and 58 which are respectively positioned proximate the back wall, the front perimeter, and at a midpoint therebetween. The center gasket 58 thus defines a division of each of the compartment 42 into forward and rearward sections 42a. and 42b. The gaskets 56, 57, and 58 closely engage with vertical sides of a pallet of goods 70 inserted therein to vertically partition the plenum chambers 152.

As noted above, the palletized goods inserted into the compartments 42 provide a structure to properly direct the airflow. If the cabinet 12 is not filled to capacity with palletized goods, optimal airflow characteristics are not achieved. Also, a partially filled cabinet 12 takes much longer to achieve proper pressurization.

As shown in FIGS. 3–4, the apparatus disclosed herein overcomes this problem by providing at least one damper 83 adjacent the vertical side walls and one of the opposing side surfaces 32, 33. The damper 83 is configured to prevent airflow through the plenum chamber 152 in a closed position and permit airflow in an open position. In a particularly preferred embodiment, the forward and rearward sections 42a and 42b each include a damper 83 located proximate the opposing side surfaces 32,33. The damper 83 is operatively associated with a lever arm 85 which is configured and positioned to be displaceable by the insertion of a pallet of goods into the pallet receiving compartment 42. The displacement of the lever 85 opens the damper 83 to permit airflow through the plenum chamber 152. Thus, the plenum chamber 152 is open only when a pallet is inserted into the forward or rearward compartment 42a,b associated with the plenum chamber 152. If a compartment 42 or a portion thereof is vacant, the associated damper remains closed, and the gaskets and horizontal rack assemblies 40 cooperate to seal the compartment 42 from airflow.

Figure 8:
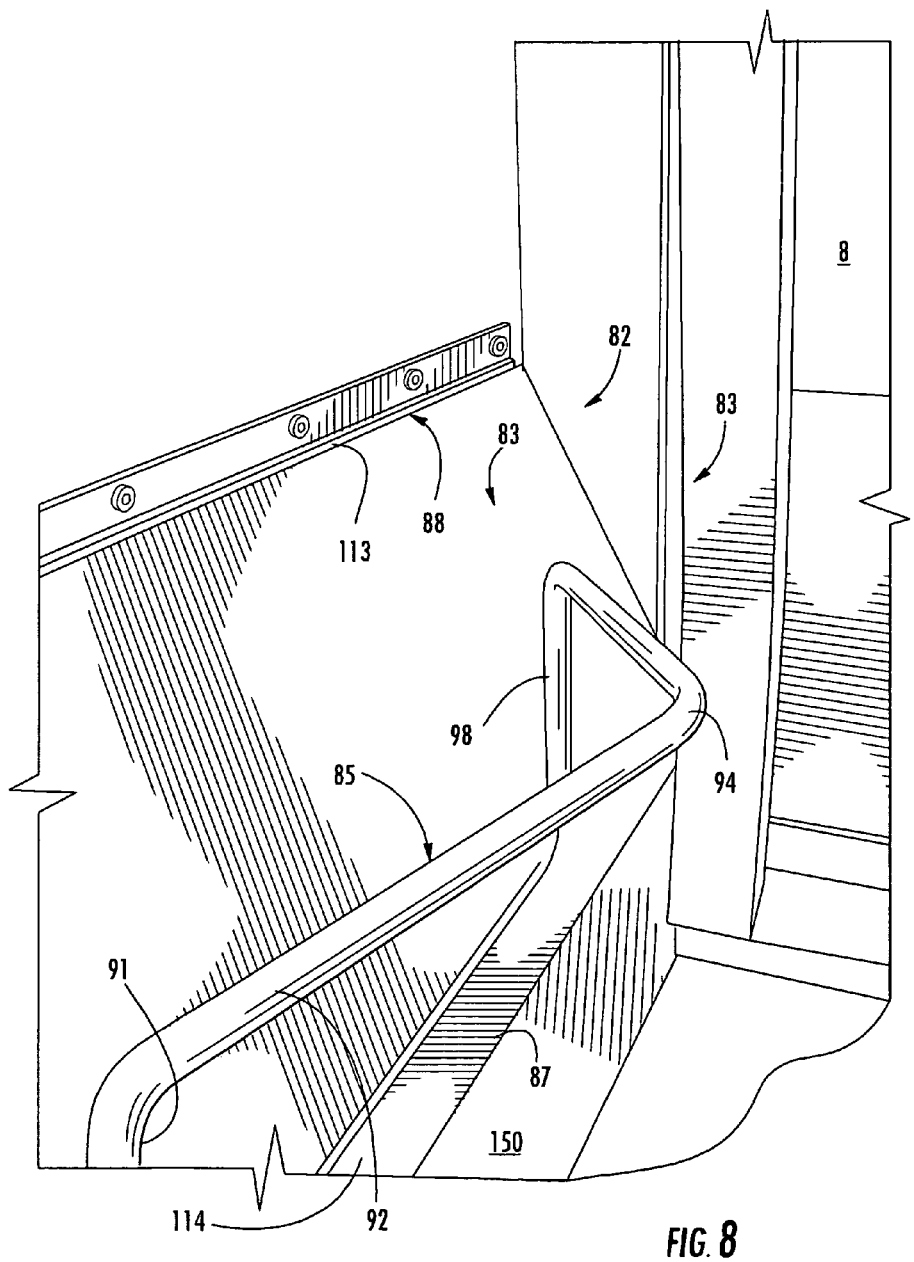
FIG. 8 is a perspective view of the damper apparatus shown a pallet partially inserted therein.

FIGS. 6–8 illustrate a preferred configuration for a damper assembly 82. FIGS. 6 and 7 are respectively a top and front view of a pair of damper assemblies 82 as would be installed in forward and rearward sections 42a and 42b. The damper assemblies 82 includes a damper 83 which is preferably a planar structure having an upper edge 113 and a lower edge 114. The upper edge 113 is pivotally attached to the opposing side wall 32, preferably using a spring-biased hinge 88. The lower edge 114 engages with the vertical side wall 150 in a closed position. Either the lower edge 114 of the damper 83 or the vertical side wall 150 includes a segment of sealing gasket 87 mounted thereon. The damper 83 is preferably angled downward to engage with the vertical wall 150. The spring-biased hinge 88 biases the damper 83 in an upward direction so that it presses closed against the vertical wall 150.

Figure 9:
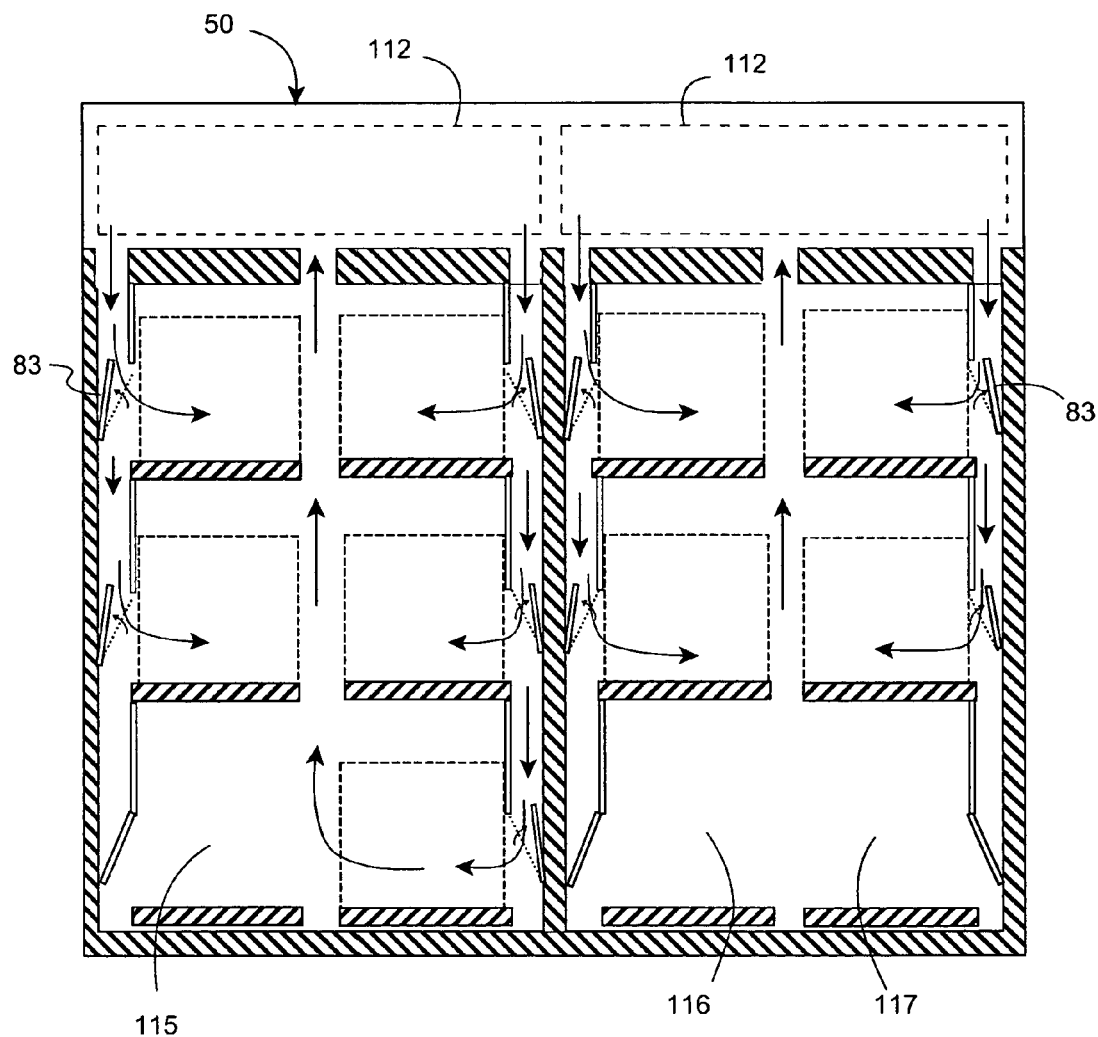
FIG. 9 is a front cross-sectional view of the apparatus of claim 1 which depicts the flow of air when the apparatus is partially filled with pallets.

The invention contemplates any number of arrangements by which the lever 85 opens the damper 83 when a pallet is inserted into the compartment. FIGS. 6 and 8 illustrate a top view of a preferred embodiment showing the position of the lever arm 85 installed into the forward and rearward sections 42a and 42b of the compartment 42. As can be seen in FIG. 7, the lever arm 85 includes a pivotally mounted vertical section 91. A second section 92 extends laterally from the vertical section 91 into the compartment 42 in an angled configuration so as to be in the path of an incoming pallet, shown in phantom. The second section 92 includes a curvilinear bend 94 which angles the second section 92 back toward the damper 83, where it extends vertically downward in a third section 98 which is attached to the lower edge 114 of the damper 83. As can be seen in the perspective view shown in FIG. 8, when a pallet 8 is pushed into the compartment 42, the side of the pallet engages with the second section 92 of the lever arm, and urges the lever arm 85 towards the side surface 32 thus opening the damper 83 as the pallet is inserted. FIG. 9 illustrates the operation of the dampers. As shown, compartments indicated as 115, 116, and 117 are empty, and the associated damper assemblies 82 are in a closed position. Airflow is thus directed only through the compartments containing pallets, which have open dampers 83.

The illustrated embodiment depicts a cabinet 12 having three tiers and two vertical chambers, however the invention is not limited in this regard. The cabinet 12 can be designed to having any suitable configuration with regard to the number of tiers and the number of vertical chambers. It is preferred, however that the cabinet 12 having three or more tiers include at least two side by side vertical chambers 31 to provide adequate stability so that external support structures are not required.

Pallet storage systems typically have a "Last In, First Out" retrieval system using rolling carts for carrying pallets so that multiple pallets can be stored on a set of rails. Such as system is generally utilizes push-back cart. This arrangement maximizes the usable space between the aisles in a warehouse since multiple pallets can be stored and retrieved from a single aisle. If a reach-in fork lift system is in use, push-back carts are unnecessary. Prior art push-back cart systems utilize inclined rails providing a gravity feed system. Other prior art gravity feed systems are implemented using multiple sets of rails nested in a "terraced" arrangement.

In the apparatus of the present invention, the inclined railings of prior art gravity feed systems are unsuitable because installation of such as system would require the removal of large portions of the vertical gaskets, and would therefore compromise the insulating properties as well the air flow with the chamber, so that the desired airflow characteristics could not be achieved. Thus, the apparatus of the present invention requires a "last in, first out" feed system which is specially adapted to work with the inventive configuration of the seals.

Figure 10:
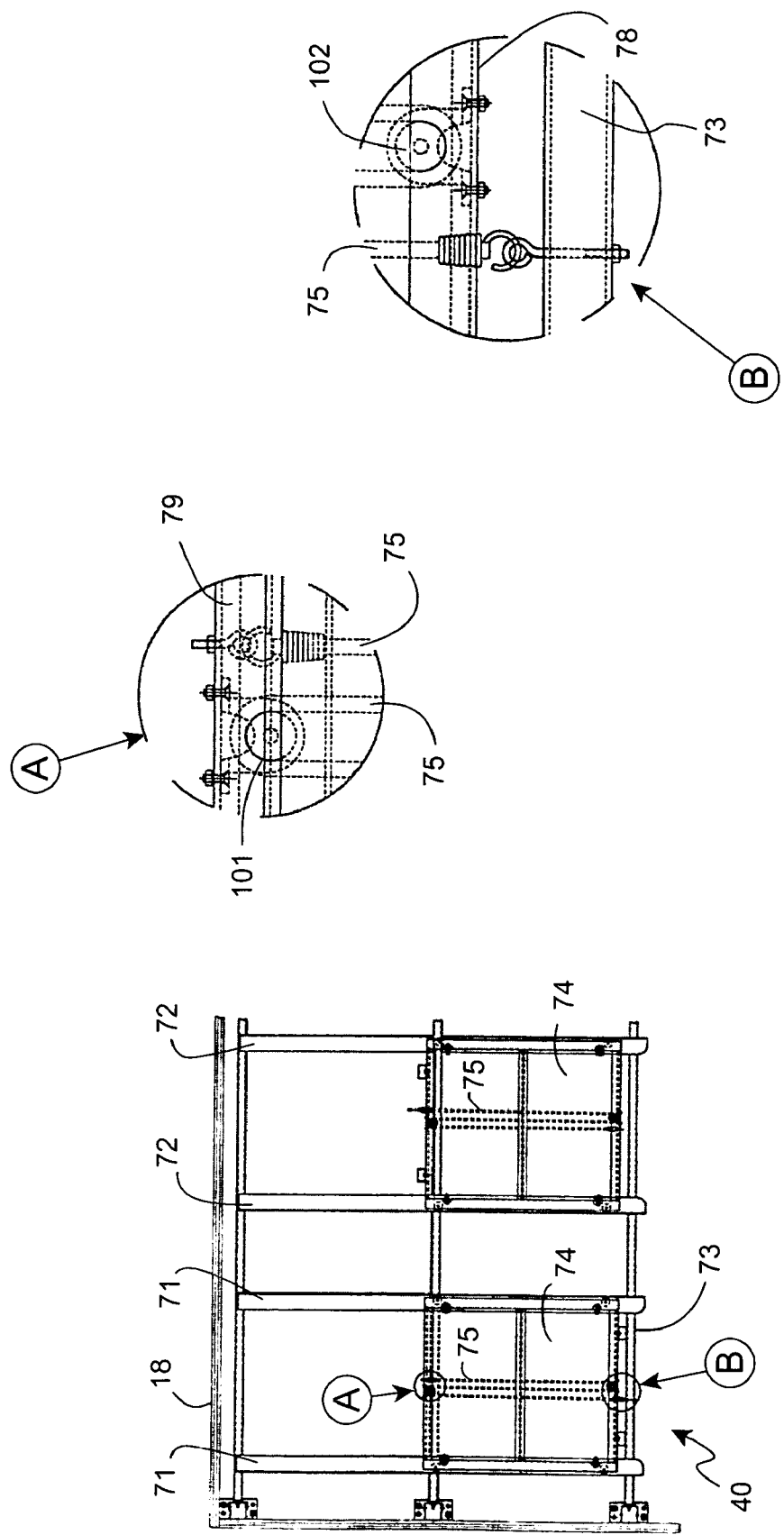
FIG. 10 is a top view of a preferred arrangement of the horizontal rack assembly of the apparatus.
Figure 11:
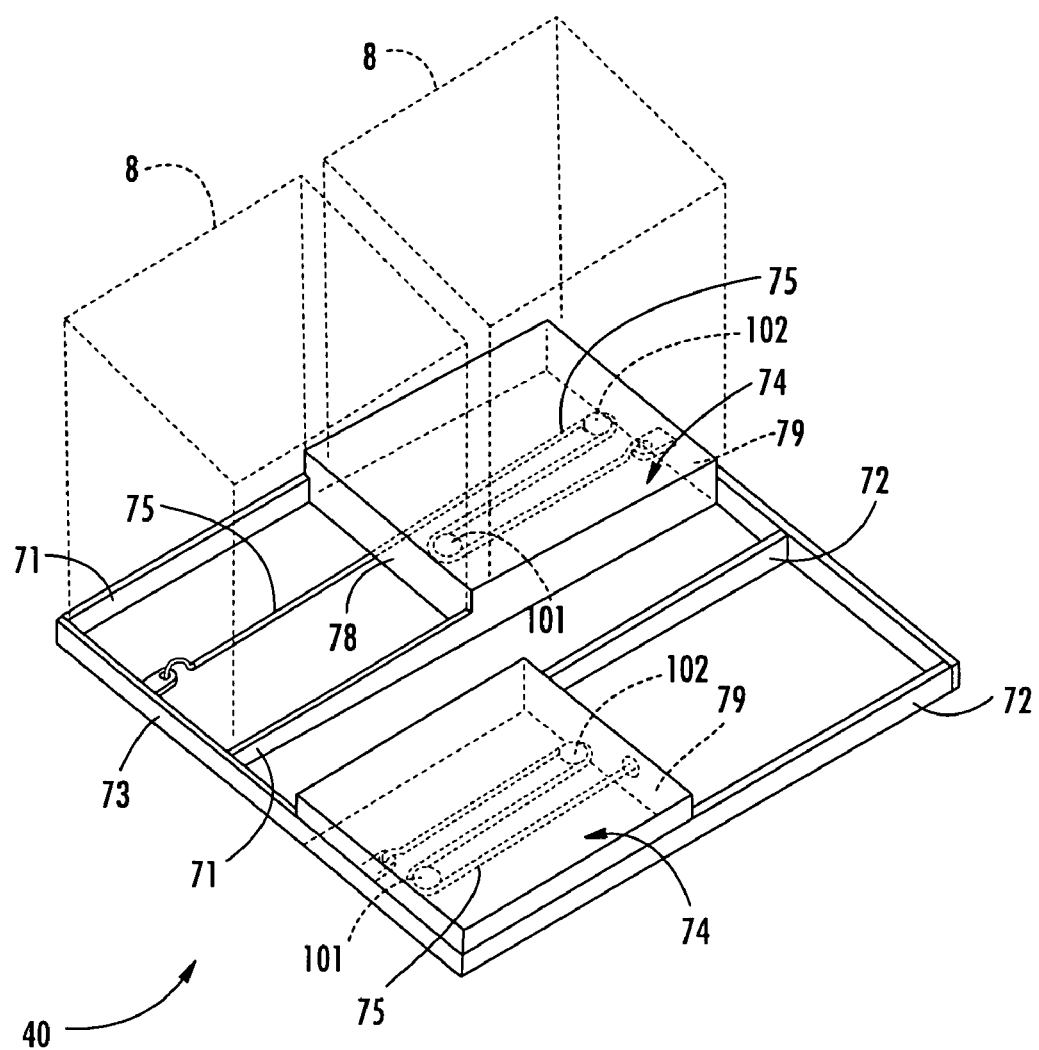
FIG. 11 is a perspective view of the horizontal rack assembly of the apparatus showing a pallet thereon.

An preferred arrangement of the horizontal rack assembly 40 of the apparatus of the invention is shown in FIGS. 10 and 11. The horizontal rack assembly includes two pairs of longitudinal carrier rails 71 and 72 that are each spaced apart to support a pallet load therebetween. The carrier rails extend from the back wall 18 to the front perimeter 23. A lateral support 73 which is coplanar with the front perimeter 23 is attached to the opposing side surfaces 32, 33 of the chamber. The carrier rails 71 and 72 are secured to the lateral support 73 and the back wall 18. Two carts 74 which are sized to receive a pallet load thereon are respectively seated within the pairs of carrier rails 71 and 72. The carts 74 include wheels positioned within the longitudinal carrier rails permitting rolling translation of the carts 74 along the longitudinal carrier rails.

For ease of description, the following discussions describes the configuration and operation of a single cart on the horizontal rack assembly 40, however both of the carts 74 and associated carrier rails are identically constructed. In the preferred embodiment of the invention, an elastic biasing means connects the lateral support 73 and the cart 74 so that the cart 74 is biased in a forward position. The elastic biasing means can be a length of elastic cord, and is preferably a bungee cord 75. Thus, a first pallet can be loaded onto the cart 74, and then urged to a rearward position by loading a second pallet onto the carrier rails. After the second pallet is removed, the elastic biasing means 75 returns the cart 74 to the forward position.

The cart 74 has a top wall 77 having a front lip 78 and a rear lip 79 depending downwardly therefrom. A first end of the bungee cord 75 is secured to the lateral support 73 and a second end is secured to said rear lip 79 of the cart 74. The bungee cord 75 can be attached using eye bolts respectively attached to the lateral support 73 and the rear lip 79 which engage with hooks on either end of the bungee cord 75.

The elastic tension provided by the bungee cord 75 is adjusted by looping the bungee corp 75 around a series of pulleys attached to the cart 74. In the preferred embodiment, the cart 74 includes at least two pulleys rotatably mounted under the cart 74 which have an axis of rotation normal to the top wall of the cart 74. The pulleys each have a circumferential groove sized to receive the bungee cord 75. In a preferred arrangement, a first pulley 101 is secured to the rear lip 79 and a second pulley 102 is secured to front lip 78, and the bungee cord 75 extends from the lateral support rack to loop around the first pulley 101 and the second pulley 102 sequentially.

By varying the length of the bungee cord 75 and the number and location of the pulleys, the elastic pre-load of the cart can be designed to be any desired value. In practice, the pre-load must be sufficient to overcome the friction between the vertical gaskets and the pallets. For a cart having a depth of 4 feet, it has been found that sufficient degree of pre-loading can be obtained by using a 8.5 ft. bungee cord stretched to 12 ft. by use of two pulleys in the above-described arrangement.

In a preferred embodiment, narrow-aisle reach-type forklifts are utilized. As the forklift approaches the palletized ripening cabinet, the outriggers are placed under the cabinet as the forks are slid into the pallet. The palletized cabinet is then elevated to allow the outriggers underneath. Next, a pallet is lifted from the "select" rack, and the forklift backs into the driveway while lowering the pallet and turning, accomplished all in one smooth motion. Since the perishable product, generally produce such as bananas, arrives already packed in ventilated, corrugated cardboard boxes on pallets, loading within a controlled environment apparatus requires little adjustment. It is estimated that the instant invention may require only a fourth of the typical operational labor and "drive-in" forklift time for a ripening room.

Use of these narrow-aisle reach-type forklifts also provides a reduction in air volume thus reducing refrigeration load, a reduction in the amount of ethylene required to commence the ripening process, a reduction in the amount of humidification and venting time, and a reduction in loading and unloading time, thereby minimizing overall equipment costs.

A preferred embodiment of the self-contained apparatus also yields a reduction in overall energy consumption. A typical ripening room employs about four fans within the same space occupied by the footprint of the palletized cabinet, whereas, in a preferred embodiment, the palletized cabinet of the instant invention is configured with two large, forced-air fans 36 for the 3-tier cabinet. These fans force (in cubic feet per minute per pound) approximately 0.6 CFM/lb through the fruit boxes in order to control the temperature of the fruit. The larger, lower speed, forced-air fans employed in the palletized cabinet work at a higher efficiency and consequently require less energy than the total of a typical ripening room's four fans.

Because typical ripening rooms are long, the overhead unit coolers must utilize either very long evaporator coils, which are typically of a length approximately twenty-eight feet, or a series of shorter coils. In either case, the need to achieve accurate temperature control throughout the length of the room can pose a problem, particularly for direct expansion evaporators. In order to achieve such uniformity, the evaporator coils in the apparatus of the instant invention are generally maintained at a length of eight feet.

Most ripening rooms use sectional overhead doors which are not sufficiently airtight. Those doors typically consist of two foot panels. For comparison purposes, a 3-tier door would require the incorporation of twelve such panels, each of which being sealed to the panel above or below it. With that many feet of seals, there is an increased chance for air leakage. Also, the wiper seals on the sides of the overhead door bridge the cracks between the door panels, thereby creating numerous potential sources for leaks. Finally, the gasket at the base of the ripening room door sits against the concrete floor. Waviness in the concrete surface can create air gaps.

However, the two slab doors 10 of the controlled environment apparatus, as instantly disclosed, travel horizontally on tracks 11. Wiper seals lay against the smooth, flat door surface to minimize air leakage and heat transfer. Although access is allowed to several pallets at a time, the slab door 10 does not protrude into the aisle, therefore the aisles may be more narrow. Additionally, the design of the door aids in a reduction in potential damage to the door. In a preferred embodiment, the door opening of the palletized cabinet is framed in metal to tolerances, which ensure a good seal.

The instant invention may also be adapted for use as a pre-cooler. Although similar to the palletized ripening cabinet which enhances ripening and the cooler cabinet which inhibits ripening, the preferred embodiment specific to a palletized pre-cooler cabinet is that the refrigeration system is enlarged to produce 20 BTU/lb and the forced air system is increased to 1.5 CFM/lb. Because they are self-contained and easy to erect, a palletized pre-cooler cabinet can be easily installed in packing sheds or on loading platforms near a farm site where building a cold room for pre-coolers would otherwise not be feasible.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

I claim:

1. An apparatus for maintaining palletized goods in a controlled environment, comprising:
   an insulated cabinet defined by a top wall, a bottom wall, a back wall, and left and right side walls defining an upright container with a generally open front having a perimeter; said open front being sealable by a front wall constructed as a selectively openable access means in sealing engagement with said perimeter, said cabinet having a depth sufficient to receive two rows deep of palletized goods and a height sufficient to receive a plurality of palletized goods in a vertically stacked arrangement wherein said cabinet has a plurality of tiers;
   at least one insulated vertical wall normal and contiguous to said back wall and extending from said top wall to said bottom wall which define at least two vertically oriented chambers in said cabinet, said at least one vertical wall having front edges in a coplanar arrangement with said perimeter and including sealing means thereon engageable with said front wall, each of said vertically oriented chambers have opposing side surfaces and a width sufficient to received two pallets of produce in a spaced apart relationship;

a plurality of horizontal rack assemblies in each of said chambers corresponding to each of said tiers defining a plurality of pallet receiving compartments within said chamber, said horizontal rack assemblies adapted to receive palletized goods in a two deep and two across arrangement such that the palletized goods are in a spaced apart relationship defining an interstitial air space there between and side airspaces on either side, said plurality of horizontal rack assemblies each having left and right sides adjacent said opposing side surfaces;

left and right vertical sidewalls respectively adjacent to said opposing side surfaces in each of said pallet receiving compartments, said left and right vertical sidewalls positioned to adjacently align with pallets inserted therein wherein said sidewalls cooperate with the pallets to define left and right plenum chambers encompassing said side air spaces; said vertical sidewalls dimensioned to expose portion of the pallets to said plenum chamber;

an airflow generating means in airflow communication with each of said chambers constructed and arranged to provide airflow into each chamber;

a refrigeration means in operative communication with said airflow generating means; and at least one damper disposed between said vertical side walls and one of said opposing side surfaces configured to prevent airflow through said plenum chamber in a closed position and permitting airflow therethrough in an open position; with said damper being operatively associated with a lever means adjacent thereto which is configured and positioned to be displaceable by the insertion of a pallet of goods into said pallet receiving compartment; wherein the displacement of said lever means opens said damper to permit airflow through said plenum chamber adjacent the pallet.

2. The apparatus of claim 1, further comprising a plurality of vertically oriented gaskets affixed to each of said opposing side surfaces of said plurality of chambers and extending from said top wall to said bottom wall, said gaskets adapted to engage with vertical edges of a pallet of goods inserted therein.

3. The apparatus of claim 2, wherein said at least three gaskets are respectively positioned proximate said back wall, said front perimeter, and at a midpoint therebetween thus defining a division of each of said compartment into forward and rearward sections;

wherein said gaskets engage with vertical edges of a pallet of goods inserted therein to partially close said side airspace adjacent to the pallet of goods, and said airflow generating means causes air to flow between said interstitial spaces and said side plenum chambers.

4. The apparatus of claim 2, wherein said dampers are located in each of said forward and rearward sections of said pallet receiving compartments whereby airflow is only directed through said forward or rearward sections having pallets inserted therein.

5. The apparatus of claim 1, wherein said front wall is be constructed as a plurality of sliding doors disposed in tracks in said top wall said bottom wall.

6. The apparatus of claim 1, wherein said refrigeration means and airflow generating means are disposed in a housing positioned under said bottom wall, and said bottom wall includes a plurality of apertures permitting airflow therethrough.

7. The apparatus of claim 6, wherein said plurality of apertures are respectively positioned to align with said plenum chambers and said interstitial air space.

8. The apparatus of claim 1, wherein said refrigeration means and airflow generating means are disposed in a housing positioned above said top wall, and said top wall includes apertures therein permitting airflow therethrough.

9. The apparatus of claim 8, wherein said plurality of apertures are respectively positioned to align with said plenum chambers and said interstitial air space.

10. The apparatus of claim 1, wherein each of said horizontal rack assemblies has a perimeter, wherein a portion of said perimeter adjacent said front wall includes a gasket attached thereto adapted for sealing engagement with said front wall.

11. The apparatus of claim 1, wherein said airflow means is a forced-air fan.

12. The apparatus of claim 1, further including a means for introducing gas into said chambers.

13. The apparatus of claim 1, wherein said gas is ethylene.

14. The apparatus of claim 1, wherein the horizontal rack assembly comprises:

two pairs of longitudinal carrier rails, each spaced apart to support a pallet load therebetween and extending from said back wall to said front perimeter;

a lateral support coplanar with said front perimeter attached to said opposing side surfaces of said chamber wherein said carrier rails are secured to said lateral support;

at least one cart sized to receive a pallet load, said cart including wheels positioned within one of the two pairs of longitudinal carrier rails permitting rolling translation of said cart along one of the two pairs of longitudinal carrier rails; and elastic biasing means connecting said lateral support and said cart, wherein said cart is biased in a forward position, whereby a first pallet can be loaded onto said cart and urged to a rearward position by loading a second pallet onto said carrier rails, and said cart returns to the forward position upon removal of the second pallet.

15. The apparatus of claim 14, wherein said elastic biasing means comprises a length of elastic cord.

16. The apparatus of claim 14, wherein said at least one cart includes a top wall having upper and lower surfaces, said top wall having a front lip and a rear lip depending downwardly therefrom; and said length of elastic cord includes first and second ends, wherein said first end is secured to said lateral support rack and said second end is secured to said rear lip of said at least one cart.

17. The apparatus of claim 16, wherein said at least one cart includes at least two pulleys rotatably mounted under said top wall having an axis of rotation normal to said top wall, and said at least two pulleys each have a circumferential groove sized to receive said elastic cord, wherein said elastic cord is looped around said at least two pulleys.

18. The apparatus of claim 17, wherein said at least two pulleys comprise a first pulley secured to said rear lip and a second pulley means secured to said front lip, whereby said elastic cord extends from said lateral support rack to loop around said first pulley second pulley sequentially and said second end of said elastic cord is fixedly attached to said rear lip.

19. An apparatus for maintaining palletized goods in a controlled environment, comprising:
   an insulated cabinet defined by a top wall, a bottom wall, a back wall, and opposing side walls defining an upright container with a generally open front having a perimeter; said open front being sealable by a front wall constructed as a selectively openable access means in sealing engagement with said perimeter, said cabinet having a depth sufficient to receive two rows deep of palletized goods and a height sufficient to receive a plurality of palletized goods in a vertically stacked arrangement wherein said cabinet has a plurality of tiers;
   at least one insulated vertical wall normal and contiguous to said back wall and extending from said top wall to said bottom wall which define at least two vertically oriented chambers in said cabinet, said at least one vertical wall having front edges in a coplanar arrangement with said perimeter and including sealing means thereon engageable with said front wall, each of said vertically oriented chambers have opposing side surfaces and a width sufficient to received two pallets of produce in a spaced apart relationship;
   an airflow generating means in airflow communication with each of said chambers constructed and arranged to provide airflow into each chamber;
   a refrigeration means in operative communication with said airflow generating means; and
   a plurality of horizontal rack assemblies in each of said chambers corresponding to each of said tiers defining a plurality of pallet receiving compartments within said chamber, said horizontal rack assemblies adapted to receive palletized goods in a two deep and two across arrangement such that the palletized goods are in a spaced apart relationship defining an interstitial air space there between and side airspaces on either side, said plurality of horizontal rack assemblies each having left and right sides adjacent said opposing side surfaces, said horizontal rack assemblies each comprising:
   two pairs of longitudinal carrier rails, each spaced apart to support a pallet load therebetween and extending from said back wall to said front perimeter;
   a lateral support coplanar with said front perimeter attached to said opposing side surfaces of said chamber wherein said carrier rails are secured to said lateral support;
   at least one cart sized to receive a pallet load, said cart including wheels positioned within one of the two pairs of longitudinal carrier rails permitting rolling translation of said cart along one of the two pairs of longitudinal carrier rails; and
   elastic biasing means connecting said lateral support and said cart, wherein said cart is biased in a forward position, whereby a first pallet can be loaded onto said cart and urged to a rearward position by loading a second pallet onto said carrier rails, and said cart returns to the forward position upon removal of the second pallet.

20. The apparatus of claim 17, wherein said elastic biasing means comprises a length of elastic cord.

21. The apparatus of claim 17, wherein said at least one cart includes a top wall having upper and lower surfaces, said top wall having a front lip and a rear lip depending downwardly therefrom; and said length of elastic cord includes first and second ends, wherein said first end is secured to said lateral support rack and said second end is secured to said rear lip of said at least one cart.

22. The apparatus of claim 19, wherein said at least one cart includes at least two pulleys rotatably mounted under said top wall having an axis of rotation normal to said top wall, and said at least two pulleys each have a circumferential groove sized to receive said elastic cord, wherein said elastic cord is looped around said at least two pulleys.

23. The apparatus of claim 20, wherein said at least two pulleys comprise a first pulley secured to said rear lip and a second pulley means secured to said front lip, whereby said elastic cord extends from said lateral support rack to loop around said first pulley second pulley sequentially and said second end of said elastic cord is fixedly attached to said rear lip.

24. The apparatus of claim 17, wherein said elastic biasing means is a bungee cord having hooks attach to each end, and said lateral support and said rear lip of said cart each have eye bolts attached thereto, whereby said hooks of said bungee cord can be inserted through said eye bolts.

25. The apparatus of claim 17, wherein said front wall is be constructed as a plurality of sliding doors disposed in tracks in said top wall said bottom wall.

26. The apparatus of claim 17, wherein said refrigeration means and airflow generating means are disposed in a housing positioned under said bottom wall, and said bottom wall includes apertures therein permitting upward therethrough.

27. The apparatus of claim 17, wherein said refrigeration means and airflow generating means are disposed in a housing positioned above said top wall, and said top wall includes apertures therein permitting airflow therethrough.

28. The apparatus of claim 17, wherein each of said horizontal rack assemblies has a perimeter, wherein a portion of said perimeter adjacent said front wall includes a gasket attached thereto adapted for sealing engagement with said front wall.

* * * * *